(No Model)
C. NUHRING.
FIRE EXTINGUISHING APPARATUS.
No. 586,105. Patented July 13, 1897.
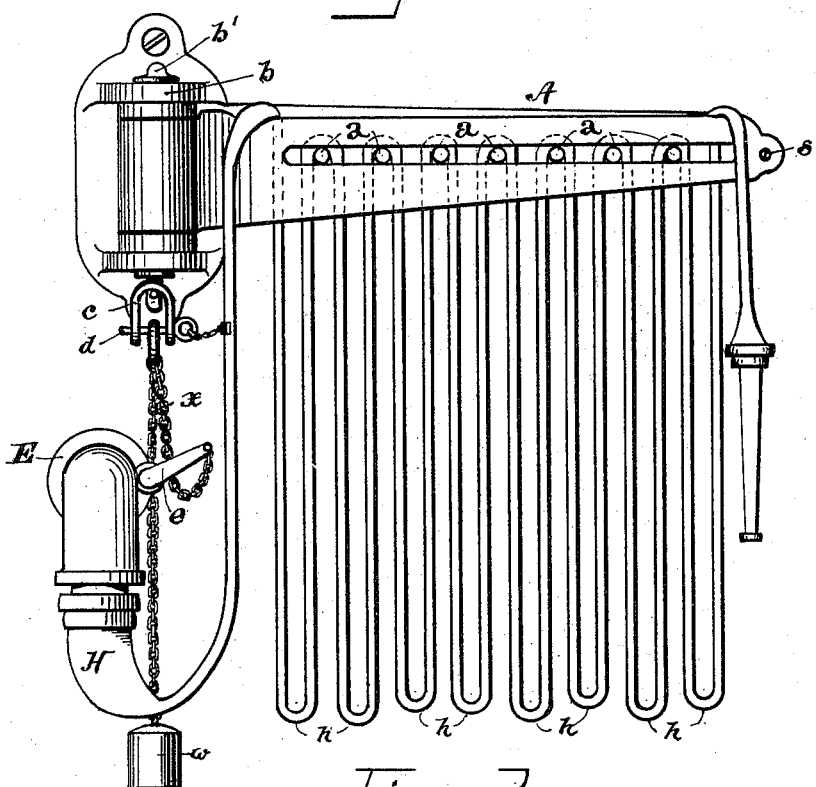
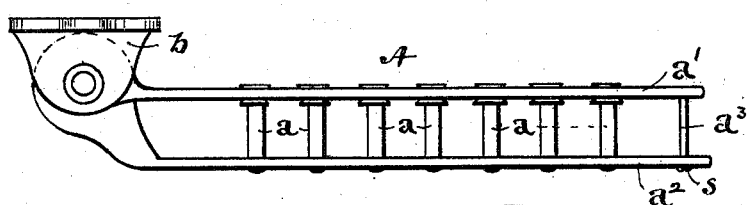
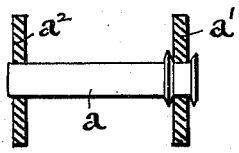
Witnesses: Charles Nuhring
Inventor

UNITED STATES PATENT OFFICE.

CHARLES NUHRING, OF CINCINNATI, OHIO.

FIRE-EXTINGUISHING APPARATUS.

SPECIFICATION forming part of Letters Patent No. 586,105, dated July 13, 1897.

Application filed May 27, 1895. Serial No. 550,792. (No model.)

*To all whom it may concern:*

Be it known that I, CHARLES NUHRING, a citizen of the United States, residing at Cincinnati, Ohio, have invented new and useful Improvements in Fire-Extinguishing Apparatus, of which the following is a specification.

My invention relates to safety appliances provided to be used in buildings in case of fire, consisting, essentially, of a hose-rack for suspending a hose in readiness for service and connections between the hose and water-plug for turning on the water by the act of drawing out the hose.

My improvements consist, first, in an improved construction of the rack whereby the detaching of the hose is facilitated and the hose is permitted to expand without injury in case water is turned on before the hose is detached from the rack; secondly, in an improved construction of the means for turning on the water whereby a perfect and certain action is insured.

My invention is illustrated in the accompanying drawings, in which—

Figure 1 is a general elevation of a hose-rack and attachments complete embodying my invention. Fig. 2 is a plan view of the rack; and Fig. 3, a detail section across the rack, showing the construction of the rollers.

Referring now to the drawings, A designates a hose-rack constructed in the similitude of a ladder—that is to say, having cross-pieces or "rungs" $a$, extending between side pieces $a'$ $a^2$, affording supports for the hose H in successive folds $h$. The side pieces in this case are pivotally secured together at one end, whereby they are adapted to be attached to and project from a wall-bracket $b$ in a horizontal plane and are temporarily secured together at their outer ends in any convenient manner, as by a permanent cross-bar $a^3$ and screw $s$.

The cross-pieces or rungs $a$ are carried in opposite corresponding slots $s'$ of the side pieces as independent pins or rollers. I prefer to construct them, as shown in Fig. 3, with washers or flanges securing them in one of the side pieces, as $a'$, permanently, so as to allow the opposite member $a^2$ to be opened upon its hinged connection for convenience in replacing the hose after use.

The usefulness of this construction is indicated in Fig. 1. In the act of pulling out the hose H the first effect is naturally to swing the general structure A into the line of "pull;" second, as the hose itself begins to pull away from the rack the first or outer pin $a$ of the series is moved out, and thus widens the space through which the first or outer fold $h$ of the hose is to be drawn. The pull then comes upon the second fold and its supporting-pin is drawn out in like manner, and thus the detachment of the hose is greatly facilitated and all danger of injury by too great resistance of friction or tendency of the hose to "kink" is avoided. The space through which it is to be drawn out is thus widened at the moment when it is to be availed of.

It will be seen that even if the rack should be so filled up by the hose as to permit no movement of the first or outer pin in the series the second would nevertheless have a movement and each successive one a greater movement.

The construction also facilitates replacing the hose, as will be readily understood. The pins $a$ have also the function of friction-rolls.

A second feature of my improvement has relation to the turning on of the water-supply. Upon the lower end of the pivot-pin $b'$ I swivel a depending yoke $c$, having an easily-withdrawable cross-pin $d$, passing through and between its jaws. Upon this pin is hung a chain or cord $x$, suspending a weight W. An extension of the chain beyond the pin $d$ is attached to the operating-lever $e$ of a water plug or valve E, with which the hose is connected. The pin $d$ is connected independently with the last fold of the hose and is drawn out by the dropping of the last fold from the rack A. As soon as the pin is drawn out the weight drops, and as the construction and arrangement of the parts give considerable "slack" of chain the weight, with its added momentum brought to bear suddenly upon the lever $e$ and insures the opening of the valve under all circumstances.

I claim as my invention and desire to secure by Letters Patent of the United States—

1. In a hose-rack, the combination of two side pieces, each having a longitudinal slot, with pins or rungs adapted to engage and move in the slots of the side pieces, substantially as set forth.

2. The combination of a pivoted hose-rack: a swivel-yoke adapted to move with the rack: a pin carried removably by the yoke and connected to the last fold of the hose: a weight supported by a chain from the pin at an intermediate point in the chain: and a water-plug whose operating-handle is connected terminally with the chain, substantially as set forth.

In testimony whereof I have hereunto set my hand in the presence of two subscribing witnesses.

CHARLES NUHRING.

Witnesses:
L. M. HOSEA,
FRANK K. BOWMAN.